United States Patent Office 3,427,080
Patented Feb. 11, 1969

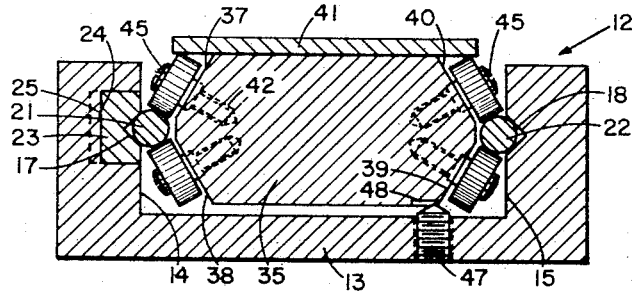
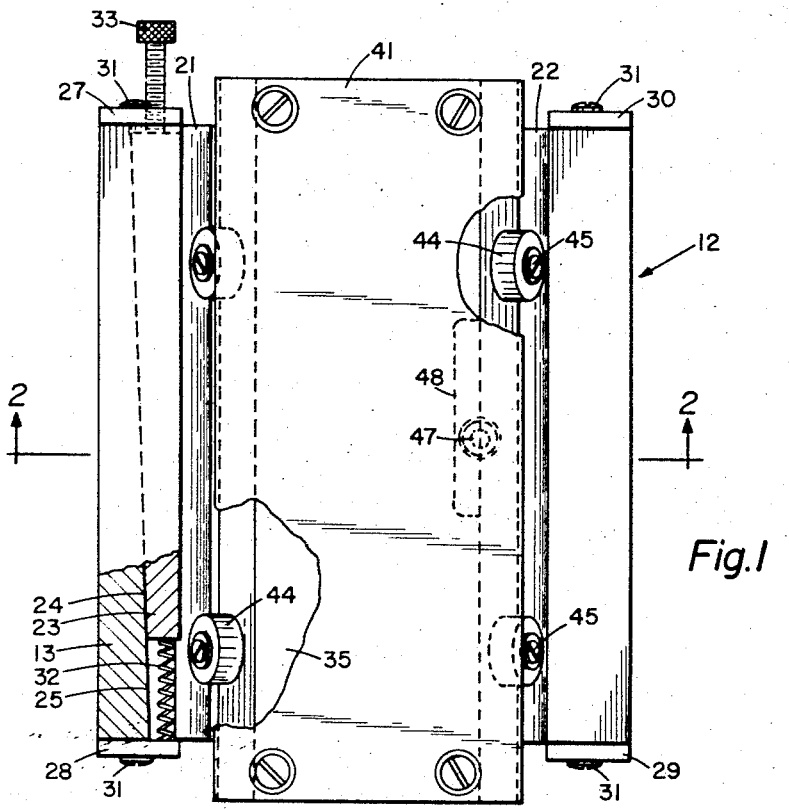

3,427,080
RECIPROCATING BEARING ASSEMBLY HAVING ROLLER-BEARING WHEELS ON A BEARING ROD
Lee E. Folk, Phoenix, Ariz., assignor to Motorola, Inc., Franklin Park, Ill., a corporation of Illinois
Filed Oct. 17, 1966, Ser. No. 587,319
U.S. Cl. 308—6                      5 Claims
Int. Cl. F16c 17/00, 21/00, 19/00

ABSTRACT OF THE DISCLOSURE

A first member having opposed V grooves respectively receiving elongated bearing rods. A second member having pairs of angled roller-bearing wheels in rolling engagement with the bearing rods supported on the first member. The engagement between the roller-bearing wheels and the rods in the V groove support the rods in the V grooves. An adjustable gib is provided for adjusting the bearing. The bearing is particularly suitable for microminiature movements.

---

This invention relates to an anti-friction reciprocating bearing assembly, and more particularly to such an assembly especially suitable for microminiature manipulations that has low starting inertia and a selective adjustment that substantially restricts the assembly to the reciprocating movement.

The capability of performing accurate microminiature manipulations is often required in assembling minute items, such as semiconductor devices. Generally, although not necessarily always, these manipulations are rectilinear and in a single plane. To perform this type of movement an assembly is used that has a member movable in a fixed plane and path of travel either with an object to be worked on or with a tool to perform work on an object in a fixed position.

Microminiature manipulations are often so minute that a microscope is used to observe movement at the work area. With fine dimensions of this nature or very close tolerance fabrications, it is desirable that the assembly be restricted solely to the reciprocating motion. This restricted movement is commonly referred to as a "no shake" condition in the moving member of the assembly.

To achieve a minute movement it is preferable that the moving member of the assembly have a low starting inertia. Once the moving member is set in motion, it should continue in motion under a constant force until intentionally stopped. Also, the moving member should be free of erratic action such as caused by binding or "hanging-up."

Assemblies have been provided that have not completely met the above-described desired operating requirements. One such assembly includes a moving member that rides on a plurality of ball bearings mounted in a housing surrounding the moving member. The bearings are mounted in the housing with a portion extending above the surface thereof for supporting the moving member. With the large number of ball bearings required to provide satisfactory support, an undue amount of maintenance is required because of the tendency of the balls to wear unevenly and develop flat spots resulting in an inability to maintain the desired no-shake condition of the moving member. Also, the ball bearing support for this moving member rides against a stationary surface resulting in a sliding action which tends to increase wear.

In another assembly, the ball bearings that support the moving member are mounted between four rods. Two of the rods are affixed to the moving member and two to the stationary member. A separator or retainer is provided to maintain the proper spacing between the ball bearings during the travel of the moving member. Substantial maintenance is required to maintain this assembly in the desired no-shake condition because of uneven wear of the ball bearings. This uneven wear is partially attributed to a sliding action that the ball bearings are subjected to when the moving member starts to move. This sliding action is believed caused, in part, by the ball bearings contacting both a stationary and a moving surface. Also, when this type of assembly is operated in a vertical position the retainers for the ball bearings tend to drift to the lower end of the assembly. The position of the retainer at the lowest portion of the assembly increases the starting inertia and the force necessary to maintain the slide in motion when acting in a downward direction. Also, the resulting excessive wear of the retainer requires additional maintenance of the assembly.

Therefore, it is an object of this invention to provide an anti-friction reciprocating bearing assembly that maintains a substantially no-shake condition.

Another object of this invention is to provide an anti-friction reciprocating bearing assembly with an improved anti-friction support requiring less maintenance.

A further object of this invention is to provide an anti-friction reciprocating bearing assembly having a low starting inertia and particularly adapted to microminiature manipulations.

A still further object of this invention is to provide an anti-friction reciprocating bearing assembly that may be maintained in motion by a substantially constant force over its entire travel.

A feature of the invention is an anti-friction reciprocating bearing assembly having movable members supported by a plurality of rolling V's consisting of pairs of spaced apart wheel-like rotatably mounted bearings.

Another feature of this invention is an anti-friction reciprocating bearing assembly including opposed bearing rods each having a cylindrical section for contacting the rotatably mounted bearings forming the rolling V.

A further feature of the invention is an adjusting means for the assembly of the invention that readily establishes a no-shake condition for the members of the assembly by altering the points of contact between the bearing rods and the wheel-like bearings.

In the accompanying drawings:

FIG. 1 is a plan view of an anti-friction reciprocating bearing assembly embodying the invention; and FIG. 2 is a view in cross section taken along line 2—2 of FIG. 1.

An anti-friction reciprocating bearing assembly embodying the invention comprises first and second members movable in a reciprocating manner relative to each other. The first member having a first face opposed to a first face of the second member and the first member having a second face opposed to a second face of the second member. The assembly includes an anti-friction coupling means having two spaced apart parallel bearing rods each having an exposed cylindrical section. One of the bearing rods is mounted respectively on one of the first faces and the other is mounted on one of the second faces. Four separated pairs of spaced apart wheel-like bearings are rotatably mounted on the members with two of the pairs capable of rolling contact respectively with each of the cylindrical sections. The wheel-like bearings each have an axis included in a plane parallel to the direction of relative motion of the member, and the planes for each pair of wheels intersect. An adjusting means is provided for selectively altering the points of contact of the wheel-like bearings and the rods.

Referring to FIGS. 1 and 2 of the accompanying drawings, an anti-friction reciprocating bearing assembly 12 embodying the invention is illustrated.

Assembly 12 includes a U shaped member 13 having vertical internal faces 14, 15 that are substantially parallel along the axis of reciprocation for the assembly. Member 13 is fabricated from extruded aluminum, although other rigid materials that will retain consistent dimensions under applied loading may be used. The overall configuration of member 13 is not limited to a U shape and may be varied a great deal compatible with the other elements comprising the final assembly. Face 14 includes a V groove 17, and face 15 includes a similar V groove 18 for retaining respectively cylindrical bearing rods 21, 22. The dimensions of grooves 17, 18 are selected so that bearing rods 21, 22 are well seated therein and are not subject to uncontrolled movement.

Groove 17 is fabricated in a gib 23 one face of which is included as a portion of face 14. Face 24 of gib 23 opposite face 14 extends away therefrom at an angle and rests on a similarly angled slot 25 formed in the vertical wall of a member 13. To insure the parallelness of grooves 17, 18 gib 23 was originally a larger rectangular block of steel that was securely fastened to member 13 with face 24 in intimate contact with face 25 and subsequently machined along with face 15 to form grooves 17, 18.

Bearing rods 21, 22 are cylindrical rods that extend the length of member 13. Preferably, a rod is used to fabricate bearing rods 21, 22 that is fabricated to close tolerances and is resistant to wear, such as hardened steel for drill stock. The diameter of the rod is matched with the dimensions of the V grooves to insure proper seating therein. Rods 21, 22 are prevented from endwise movement by cover plates 27, 28, 29, 30 that are secured to the ends of the vertical walls of member 13 by screws 31.

Gib 23 is slidably mounted in slot 25. Gib 23 is also shorter in length than slot 25 being retained in a selected position by springs 32 that bear against cover plate 28 and an adjusting screw 33 that is screwed into a threaded opening in cover plate 27. The selected position of gib 23 may be made by the single adjustment of screw 33.

Disposed partially within member 13 is a second member 35. Member 35 is conveniently fabricated from extruded aluminum, although other rigid materials are satisfactory therefore. The sides of member 35 opposed faces 14, 15 are each comprised of two surfaces 37, 38 and 39, 40 respectively that extend away from faces 14 and 15 at an angle having its apex at the center line of member 35. A mounting plate 41 is also affixed to member 35 and extends beyond the vertical walls of member 13 to be used for integrating assembly 12 with another structure.

Ball bearing wheels 44, two on each of faces 37, 38, 39, 40 are mounted on member 35 by screws 45 inserted through the hub of each wheel and screwed into threaded receptacles 42 in member 35. Wheels 44 are oriented in pairs on adjacent faces 37, 38 and 39, 40 with the axis of the wheels comprising a pair falling in a common plane.

The invention is not limited to ball bearing wheels. Other rotatably mounted wheel-like bearings such as nylon rollers, laminated rollers, roller bearing wheels, etc. may be used. The wheels selected should be assembled to close tolerances and preferably self-contained, that is, prelubricated. Play in assembly 12 when adjusted is generally attributable to the amount of play in the wheel-like bearings, therefore to obtain the desired no-shake condition the wheel-like bearings used should have a similar freedom from play.

Two pairs of wheels 44 contact each of bearing rods 21, 22. The points of contact of wheels 44 with the bearing rods establish a rolling V relationship therebetween and a movable relationship between member 13 and 35. Wheels 44 also retain bearing rods 21, 22 in grooves 17, 18 when member 35 is positioned therebetween.

A stop 47 extends through member 13 into a slot 48 in member 35. Slot 48 extends for a limited portion in member 35 such that movement of member 35 is terminated before wheels 44 extend beyond bearing rods 21, 22.

Even with close tolerance ball bearing wheels 44, or other close tolerance rolling bearings, shake in assembly 12 may result from play between the wheels and the bearing rods. To establish a no-shake condition, such as that desired for assembling semiconductor devices, a microscope or similar optical instrument for observing the movable member of assembly 12 is advantageous. A reference point, observable through the microscope, is established on the movable member relative to a fixed point to determine when a no-shake condition is established. With the reference points established, adjusting screw 33, which had been previously loosened, is tightened against gib 23. This tightening moves gib 23 along slot 25 and, because of the slope thereof and matching face 24, moves bearing rod 21 resting therein closer to bearing rod 22. As the bearing rods move closer together they move into the apex of the V formed by the rolling surfaces of ball bearing wheels 44 and form a more intimate contact therewith. By observing the reference points as adjusting screw 33 is tightened, the point at which a no-shake condition is obtained is readily determined.

With the spring loaded gib and a single adjusting screw the no-shake condition is locked in as soon as it is obtained and the equipment may be used immediately. Also, if it is necessary to alter the position of gib 23 and thereby directly destroy the no-shake condition, the same no-shake condition may again be readily established in the straight-forward manner outlined.

Because of the efficiency of the rolling contact, the starting inertia of the movable member when a no-shake condition is established for the assembly is about two grams. With this low starting inertia very fine movements of the members may be accurately made.

Assembly 12 is advantageously used in a horizontal, vertical or inclined position. When used in other than a horizontal position, the weight of the moving member and the article mounted thereon may be counterbalanced to establish a preselected load. The counterbalancing should be performed with adjusting screw 33 loosened so that the moving member is free. After establishing the desired counterbalance, adjusting screw 33 should be tightened as previously described to establish a no-shake condition. Again, once a no-shake condition is established the equipment may be utilized immediately without further adjustment of the counterbalance because the increase in loading resulting from the establishment of a no-shake condition is negligible.

Although the described assembly 12 is only suitable for rectilinear motion, the anti-friction bearing assembly of this invention may also be used for arcuate motions. To change the mode of operation in this way, concentric bearing rods may be substituted for the straight bearing rods. In a similar manner, a combination of straight and concentric bearing rods may be used to obtain a varying direction of travel. Also, the plane of travel may be changed by altering the elevation of the bearing rods. At any given instant, with concentric bearing rods or combinations thereof, the same beneficial rolling V may exist. The wheel-like bearings may be pivotally mounted on the members so that their relationships thereto varies while a rolling V is maintained.

With the rolling contact of the invention, the wear resulting to the bearing surfaces because of the contacting of both a stationary and a moving object is substantially reduced. With this reduction in wear, the maintenance required for the assembly is similarly reduced.

The above-described assembly, and adjustment thereof, illustrate one embodiment of the invention and it will be understood that modifications and variations may be made thereof within the scope of the invention. The positions of the rolling bearings and the bearing rods may be exchanged between the members and adjusted relative to one another. Also, the length of the members of the assembly may be greatly increased by additional rolling bearings and a corresponding change in the length of the bearing rods. In a similar manner, the configuration of the individual members or the overall assembly may be altered within the scope of the invention.

The above description and drawings show that the present invention provides a novel anti-friction reciprocating bearing assembly. Furthermore, this assembly may be maintained in a substantially no-shake condition with a reduced amount of wear and maintenance. Moreover, the assembly of this invention has a low starting inertia and may be maintained in motion with a constant force over its entire length of operation.

What is claimed is:
1. An antifriction reciprocating bearing assembly having first and second members relatively movable with respect to each other in a reciprocating manner in a given direction, said first member having oppositely outwardly facing side surfaces and said second member having facing side surfaces respectively facing said oppositely facing surfaces on said first member, the improvement including in combination,
one of said members having surfaces including an elongated V groove disposed centrally of said surfaces on the other member and extending in said given direction,
said other member having tapered surfaces extending away from said surfaces on said one member such that the angle between said tapered surfaces adjacent the respective V groove has an apex adjacent such V groove,
a roller rotatably mounted on each of said tapered surfaces for rotation in said given direction,
an elongated rod disposed in each of said V grooves and being in rolling engagement with a pair of said rollers disposed respectively adjacent to said V grooves, and
adjustment means for laterally adjusting the engagement of said rods in said V grooves with said rollers such that each rod is held in said V grooves laterally by rolling contact with said rollers.

2. An assembly according to claim 1 in which said first member includes a depressed region extending a preselected length parallel to said axis of reciprocation terminating in end portions comprised of said first member; and said second member includes a projection extending into said depression capable of contacting said end portions.

3. An assembly according to claim 1 in which said rollers are ball bearing wheels having an inner hub and an outer surface rotatably supported on said hub by a plurality of spherical members.

4. An assembly according to claim 1 in which said adjusting means includes a gib for receiving one of said bearing rods slidably mounted in a receptacle in one of said members, a first face of said gib being common with one of said faces of said members, said gib having a second face opposite said first gib face extending away therefrom at an angle, said receptacle including a matching surface for said second gib face capable of intimate contact therewith; means urging said gib in a first direction parallel to said axis of reciprocation; and means urging said gib opposite said first direction.

5. An assembly according to claim 4 in which said means for urging said gib in a first direction comprises a cover plate affixed at the end of said receptacle including a threaded opening with a bolt adjustably extending therethrough being upon said gib; and said means urging said gib opposite said first direction comprises a spring urging said gib in said opposite direction.

References Cited
UNITED STATES PATENTS

| 134,698 | 1873 | Otis | 308—6 |
| 2,992,620 | 7/1961 | Cherkas | 308—6 |
| 3,113,807 | 12/1963 | Polidor | 308—6 |
| 3,123,108 | 3/1964 | Gaskell et al. | 308—6 X |
| 3,145,065 | 8/1964 | Cator | 308—6 |
| 3,161,165 | 12/1964 | Comerio | 308—6 X |
| 3,168,304 | 2/1965 | Condon | 308—3.8 |
| 3,342,534 | 8/1967 | King | 308—6 |
| 599,429 | 2/1898 | Webb | 308—6 X |
| 2,242,498 | 5/1941 | Zwick | 308—6 |

FOREIGN PATENTS

| 690,230 | 4/1953 | Great Britain. |
| 933,339 | 4/1948 | France. |
| 1,032,344 | 7/1953 | France. |

MARTIN P. SCHWADRON, *Primary Examiner.*

L. L. JOHNSON, *Assistant Examiner.*